(12) United States Patent  
Krapez

(10) Patent No.: US 12,306,045 B2  
(45) Date of Patent: May 20, 2025

(54) IMAGE CAPTURE USING RADIATION-SENSITIVE ELEMENTS HAVING A MEMORY EFFECT

(71) Applicant: OFFICE NATIONAL D'ETUDES ET DE RECHERCHES AÉROSPATIALES, Palaiseau (FR)

(72) Inventor: Jean-Claude Krapez, Pelissanne (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 496 days.

(21) Appl. No.: 17/779,956

(22) PCT Filed: Nov. 14, 2020

(86) PCT No.: PCT/EP2020/082167  
§ 371 (c)(1),  
(2) Date: May 25, 2022

(87) PCT Pub. No.: WO2021/104905  
PCT Pub. Date: Jun. 3, 2021

(65) Prior Publication Data  
US 2023/0010469 A1     Jan. 12, 2023

(30) Foreign Application Priority Data  
Nov. 28, 2019   (FR) ...................................... 1913415

(51) Int. Cl.  
*G01J 5/10*     (2006.01)  
*G01J 5/08*     (2022.01)  
(Continued)

(52) U.S. Cl.  
CPC ............... *G01J 5/10* (2013.01); *G01J 5/0853* (2013.01); *H04N 23/23* (2023.01);  
(Continued)

(58) Field of Classification Search  
CPC .... G01J 5/10; G01J 5/0853; G01J 2005/0077; H04N 23/23; H04N 25/626; H04N 25/76  
See application file for complete search history.

(56) References Cited

U.S. PATENT DOCUMENTS 5,249,123 A * 9/1993 Hsieh ................... A61B 6/032  
378/19  
5,731,794 A * 3/1998 Miyazawa ............... H04N 9/30  
348/791  
(Continued)

FOREIGN PATENT DOCUMENTS

CA     2 593 454     2/2008  
CA     2 647 370     6/2009  
(Continued)

OTHER PUBLICATIONS

International Search Report and Written Opinion for PCT/EP2020/082167, dated Feb. 23, 2021, 15 pp.  
(Continued)

*Primary Examiner* — Nathaniel T Woodward  
*Assistant Examiner* — Philip L Cotey  
(74) *Attorney, Agent, or Firm* — Maier & Maier, PLLC

(57) ABSTRACT

Disclosed is a method for capturing images that makes it possible to correct at least partially a memory effect of sensitive elements of a matrix used to capture the images. A corrected image is formed by subtracting, from a captured new raw image, a part of a prior raw image that was captured before the new raw image. The method is particularly suitable for sensitive elements with a first-order transfer function with respect to time, such as bolometers or microbolometers. Correction of the memory effect makes it possible to improve the transfer function and/or reduce a tail effect that is present in the images when scene elements move.

20 Claims, 4 Drawing Sheets

(51) Int. Cl.
*H04N 23/23* (2023.01)
*H04N 25/626* (2023.01)
*H04N 25/76* (2023.01)
*G01J 5/00* (2022.01)

(52) U.S. Cl.
CPC ........... *H04N 25/626* (2023.01); *H04N 25/76* (2023.01); *G01J 2005/0077* (2013.01)

(56) References Cited

U.S. PATENT DOCUMENTS

| | | | | |
|---|---|---|---|---|
| 6,028,314 | A * | 2/2000 | Finkler | A61B 6/032 |
| | | | | 348/E5.079 |
| 6,040,568 | A * | 3/2000 | Caulfield | H04N 25/671 |
| | | | | 348/311 |
| 7,692,146 | B2 | 4/2010 | Tissot | G01J 1/4228 |
| | | | | 250/332 |
| 8,080,793 | B2 * | 12/2011 | Dupont | H04N 25/673 |
| | | | | 505/161 |
| 8,431,901 | B2 * | 4/2013 | Crastes | H04N 25/76 |
| | | | | 250/339.04 |
| 11,875,483 | B2 * | 1/2024 | Durand | H04N 23/80 |
| 2002/0106123 | A1 * | 8/2002 | Inoue | G06T 5/92 |
| | | | | 382/168 |
| 2006/0228100 | A1 * | 10/2006 | Ignatowicz | G06T 5/80 |
| | | | | 396/153 |
| 2008/0048119 | A1 * | 2/2008 | Tissot | G08G 1/165 |
| | | | | 348/E5.09 |
| 2009/0152465 | A1 * | 6/2009 | Dupont | H04N 25/673 |
| | | | | 250/338.1 |
| 2010/0080337 | A1 * | 4/2010 | Seppi | G21K 1/10 |
| | | | | 378/5 |
| 2010/0142791 | A1 * | 6/2010 | Tsuji | G06T 11/00 |
| | | | | 382/132 |
| 2011/0186737 | A1 * | 8/2011 | Crastes | H04N 25/76 |
| | | | | 250/338.4 |
| 2011/0248167 | A1 * | 10/2011 | Gurvitch | G01J 5/24 |
| | | | | 250/338.1 |
| 2012/0188582 | A1 * | 7/2012 | Yamaguchi | H04N 1/4053 |
| | | | | 358/1.14 |
| 2013/0299679 | A1 * | 11/2013 | Kyushima | H04N 25/76 |
| | | | | 250/208.1 |
| 2019/0349541 | A1 * | 11/2019 | Iwashita | H04N 25/40 |
| 2022/0198618 | A1 * | 6/2022 | Durand | H04N 23/80 |
| 2023/0010469 | A1 * | 1/2023 | Krapez | G01J 5/10 |

FOREIGN PATENT DOCUMENTS

| | | |
|---|---|---|
| EP | 3 301 640 | 4/2018 |
| JP | 2010087563 A | 4/2010 |
| JP | 2010131223 A | 6/2010 |
| KR | 2000-0026869 | 5/2000 |
| WO | 2010/037944 | 4/2010 |
| WO | 2014/100787 | 6/2014 |

OTHER PUBLICATIONS

Larry M. Miloshevich et al., "Development and Validation of a Time-Lag Correction for Vaisala Radiosonde Humidity Measurement", Journal of Atmospheric and Oceanic Technology, vol. 21, Sep. 2004, pp. 1305-1327.

Beata Oswald-Tranta et al., "Motion deblurring of infrared images from a microbolometer camera", Infrared Physics & Technology, vol. 53, No. 4, 2010, pp. 274-279.

* cited by examiner

IMAGE CAPTURE USING RADIATION-SENSITIVE ELEMENTS HAVING A MEMORY EFFECT

This application is the U.S. national phase of International Application No. PCT/EP2020/082167 filed Nov. 14, 2020 which designated the U.S. and claims priority to FR 1913415 filed Nov. 28, 2019, the entire contents of each of which are hereby incorporated by reference.

BACKGROUND OF THE INVENTION

Field of the Invention

The present description relates to a method for capturing images which uses sensitive elements exhibiting a memory effect, as well as to an image sensor which implements such method.

Description of the Related Art

There exists a wide variety of image sensors, which vary according to the type of radiation to which they are sensitive and their mode of operation for capturing an image.

In the present description, radiation will be understood to mean all types of external signals capable of originating from a scene and reaching an image sensor so that images of the scene can be captured by the sensor, each image in the form of a set of intensity values respectively assigned to points of the image, arranged in a matrix. In particular, the radiation may be electromagnetic radiation in any wavelength range, in particular X-rays, ultraviolet radiation, visible light, near infrared, and so-called thermal infrared ranges. It may also be acoustic radiation, in particular in the field of ultrasound.

The image sensor comprises a matrix of sensitive elements individually capable of producing a detection signal that varies according to an intensity of the radiation received by the sensitive element. There can then be a one-to-one correspondence between the points of the image and the sensitive elements of the image sensor.

For image sensors of a first type, acquisition of the detection signal is produced by exposing each sensitive element to the radiation originating from the scene, for a determined duration which is commonly called accumulation period. Next, the detection signal that has been generated by the radiation in the sensitive element during the accumulation period is read by a dedicated circuit. Then the sensitive element is reset, between the reading of the detection signal which is carried out in order to capture an image, and the start of a new accumulation period dedicated to capturing a subsequent image. Such reset ensures that successively captured images correspond to separate accumulation periods. The present description does not concern sensitive elements or image sensors of this first type.

It concerns image sensors for which each sensitive element can be in a variable instantaneous state which depends on the radiation received by this sensitive element. With sensors of this second type, an image is captured by reading values which are characteristic of the respective instantaneous states of the sensitive elements of the sensor matrix. Most often, no reset of each sensitive element is possible or is implemented between two successively captured images. In this case, the detection signal which is read from each sensitive element in order to capture an image may depend not only on the radiation received by this sensitive element at the read-out time, but may also depend on the radiation that has been previously received by the same sensitive element. In other words, the detection signal which is read results from a combination of the radiation intensities which have been continuously received by the sensitive element up to the read-out time. Such effect is commonly referred to as "memory effect" by those skilled in the art, and because of this memory effect, each captured image results from a combination of scene states that have successively occurred. When the scene varies over time, the memory effect causes degradation in the image quality, which can appear in different forms depending on the nature of the patterns in the scene and on the movements of some of these patterns. In particular, the memory effect of the sensitive elements of an image sensor of the second type can appear in the form of a reduction in the image contrast, a tail effect which affects moving elements of the scene, etc.

Methods have been developed to reduce such memory effect, which include applying an erasing sequence to at least one of the sensitive elements of the matrix sensor between the instants when two successive images are captured. Such erasing sequences are applied by a dedicated electronic circuit, sometimes called a thermalization circuit. Such methods are hardware-based, in the sense that they act on the sensitive elements of the image sensor.

Other methods have also been developed to reduce the memory effect. They are software-based, and consist of combining together several raw images as directly resulting from successive readings of the sensitive elements. Matrix or scalar coefficients are used to produce a temporal filtering function through convolution and/or linear combination. But the determination of these coefficients is a difficult task, which can cause a reduction in the information contained in the images, and/or can amplify image noise. Furthermore, such filtering operations are not specially adapted for correcting a memory effect of the sensitive elements of the image sensor. The resulting correction is then not optimal for the memory effect.

An object of the invention is therefore to reduce image degradations caused by the memory effect, for image sensors of the second type presented above. In particular, an object of the invention is to improve the transfer function of the image sensor and/or to reduce a tail effect which is present in the images when elements of the scene are moving.

SUMMARY OF THE INVENTION

To achieve this or another object, a first aspect of the invention proposes a method for capturing images, wherein several images are successively captured using a same matrix of sensitive elements, each sensitive element exhibiting a memory effect which makes a raw detection signal of the sensitive element depend on an amount of radiation received by this sensitive element at a read-out time at which the raw detection signal is read, but also depend on amounts of radiation received by the same sensitive element before the read-out time.

According to the invention, in order to form an image which is at least partially corrected for the memory effect, called corrected image, an intensity value of a point of the image is assigned separately to each of the sensitive elements of the matrix, this value being proportional to a difference between the raw detection signal of the sensitive element as read for a new captured image, called new raw image, and a part of the raw detection signal of the same sensitive element as read for another image captured before the new raw image, and called prior raw image.

Thanks to such correction, the image degradation caused by the memory effect of the sensitive elements, for each raw image constructed from the raw detection signals as read from the sensitive elements, is reduced in the corrected image constructed from the image point intensity values. The prior raw image is used to evaluate at least part of the memory effect content, and this part of the memory effect content is subtracted from the content of the new raw image, separately for each sensitive element. The resulting corrected image then mainly corresponds to the radiation received by each sensitive element between the two read-out times of the raw images.

Such correction of the memory effect, which consists of using images constructed from the image point intensity values calculated according to the invention, instead of the raw images constructed from raw detection signals such as read in the sensitive elements, is all the more efficient when the "new" and "prior" raw images are captured with a short duration between the read-out times of the sensitive elements. For this purpose, when several prior raw images have been captured before the new raw image, the one used to calculate the image point intensity values for the corrected image may preferably be the last one of the prior raw images captured before the new raw image, in the chronological order of capture of the raw images.

In preferred embodiments of the invention, the image point intensity value which is assigned to each of the sensitive elements in order to form the corrected image, may be proportional to a difference between the raw detection signal of the sensitive element as read for the new raw image, and a result of multiplying, by $\exp(-\Delta/\tau)$, the raw detection signal of the same sensitive element as read for the prior raw image. $\exp(.)$ designates an exponential function, $\tau$ is a characteristic response time of the sensitive element, and $\Delta$ is a non-zero duration between the read-out times of the sensitive element respectively for the new raw image and the prior raw image. Such combining of the new raw image and the prior raw image, in order to produce the corrected image, is all the more appropriate when an operation of each sensitive element corresponds to a first-order transfer function with respect to time, or can be approximately described by such a first-order transfer function with respect to time. In the context of the invention, the transfer function, denoted f(s), of a radiation-sensitive element is the quotient of the Laplace transform of the raw detection signal produced by the sensitive element in response to the incident radiation, by the Laplace transform of the intensity of the incident radiation. In other words: $f(s)=A_d(s)/A_R(s)$, where s designates the Laplace variable, f is the transfer function of the sensitive element, $A_R$ designates the Laplace transform of the intensity of the radiation which is incident on the sensitive element, and $A_d$ designates the Laplace transform of the raw detection signal produced by the sensitive element. This transfer function is said to be first order with respect to time when it is of the form:

$$f(s) = \frac{G}{1+\tau \cdot s},$$

where G is a gain coefficient and $\tau$ a characteristic response time, which are fixed for each sensitive element. The memory effect correction provided by the preferred embodiments of the invention is particularly suitable for sensitive elements with first-order transfer function with respect to time. But it is also effective for sensitive elements which do not have first-order transfer function with respect to time, by providing partial correction of the memory effect.

For such preferred embodiments of the invention, the image point intensity value which is assigned to each sensitive element in order to form the corrected image, may be proportional to the result of dividing by $[1-\exp(-\Delta/\tau)]$ the difference between the raw detection signal of the sensitive element as read for the new raw image, and the result of multiplying by $\exp(-\Delta/\tau)$ the raw detection signal of the same sensitive element as read for the prior raw image. The division by $[1-\exp(-\Delta/\tau)]$ can in particular avoid attenuation of the intensity of the corrected image, which could be all the greater when the duration $\Delta$ between the respective read-out times for the new raw image and the prior raw image is short. Optionally, an additional proportionality factor may be applied, in addition to $1/[1-\exp(-\Delta/\tau)]$, in order to adjust the scale of the image point intensity values of the image corrected of the memory effect. This additional proportionality factor may be constant, in the sense that it does not depend on the duration $\Delta$ between the respective read-out times for the new raw image and the prior raw image, nor on the characteristic response time $\tau$.

In various embodiments of the invention, including the aforementioned preferred embodiments, at least one of the following additional features may optionally be reproduced, alone or by combining several of them together:

the duration $\Delta$ between the respective read-out times of a same sensitive element respectively for the new raw image and for the prior raw image, may be less than the characteristic response time $\tau$ of this sensitive element;

the duration $\Delta$ between the read-out times of a same sensitive element respectively for the new raw image and the prior raw image, may be between 0.02 and 0.2 times the characteristic response time $\tau$ of this sensitive element;

each sensitive element may be a bolometer or a microbolometer, a thermopile, a pyroelectric sensor, a ferroelectric sensor, or a thermally deformable microlever sensor;

the sensitive elements of the matrix may be sensitive to electromagnetic radiation, including infrared radiation, in particular thermal infrared, X-rays, sound radiation, in particular ultrasonic radiation, etc.;

a same value of the characteristic response time $\tau$ may be common to all sensitive elements of the matrix;

the method may comprise a preliminary step during which a value of the characteristic response time $\tau$ is determined separately for each of the sensitive elements of the matrix. Then, the value of the characteristic response time T thus determined for each of the sensitive elements may be used to calculate the image point intensity value attributed to it for forming the corrected image;

each corrected image may be formed from a pair of raw images, comprising a new raw image and a prior raw image that has been captured before the new raw image. Then, the pairs of raw images used to form successive corrected images may be disjoint, non-interlaced, and chronologically successive; and several corrected images may be formed by combining a same new raw image with several prior raw images successively captured prior to the new raw image. In this case, each corrected image is obtained by using, for the duration $\Delta$ relating to each sensitive element, the difference between the read-out times of this sensitive element respectively for the new raw image and for the prior raw image which is used to form this corrected image. A progressive reduction of a tail effect can then be observed by comparing the corrected images obtained in this manner. Possibly, this reduction in the tail effect may make it possible to evaluate the travel speed of certain elements of the imaged scene which are in motion.

A second aspect of the invention proposes an image sensor which comprises:
- a matrix of sensitive elements, each sensitive element exhibiting a memory effect which makes a raw detection signal that is read from this sensitive element depend on an amount of radiation received by the sensitive element at a read-out time at which the raw detection signal is read, but also depend on amounts of radiation received by the same sensitive element before the read-out time, and
- an image processing module, adapted for outputting images at least partially corrected of the memory effect, each corrected image being formed by image point intensity values which are respectively assigned to the sensitive elements of the matrix, the image processing module being adapted for calculating the image point intensity value of any one of the sensitive elements as being proportional to a difference between the raw detection signal of the sensitive element as read for a new raw image, and a part of the raw detection signal of the same sensitive element as read for a prior raw image captured before the new raw image.

Such image sensor may be adapted to implement a method according to the first aspect of the invention, optionally including its preferred modes of implementation and its optional additional features.

BRIEF DESCRIPTION OF THE DRAWINGS

The features and advantages of the invention will be more clearly apparent in the following detailed description of some examples of non-limiting implementations, with reference to the appended figures, in which.

DESCRIPTION OF THE PREFERRED EMBODIMENTS

Figure 1:
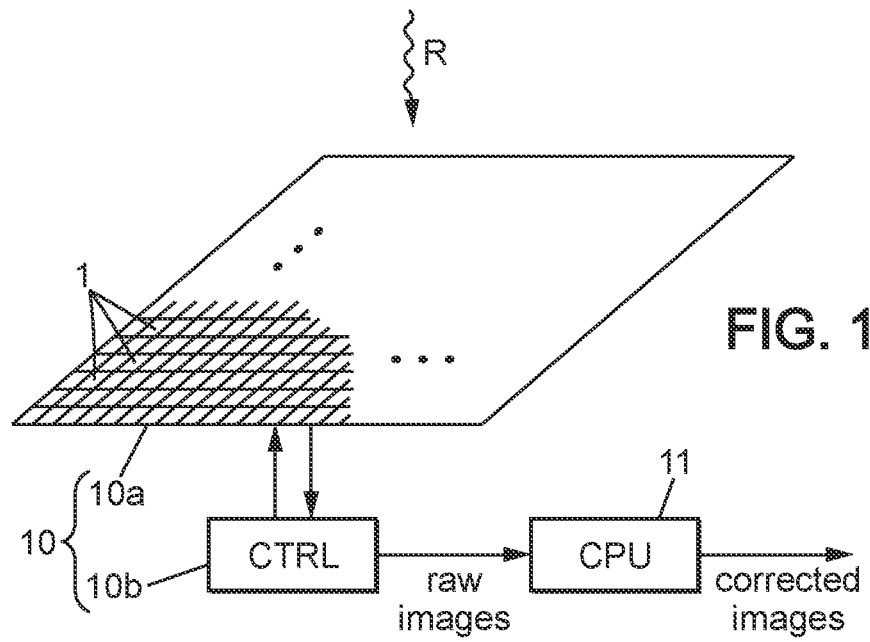
FIG. 1 is a block diagram of an image sensor according to the invention.

According to FIG. 1, an image sensor 10 comprises a matrix 10*a* of sensitive elements 1, which are arranged at the intersections of rows and columns of the matrix, and can be considered as independent of each other. For example, the matrix 10*a* may be composed of 320×240 sensitive elements 1. All the sensitive elements 1 may be identical, in particular of a model known to those skilled in the art. For example, each sensitive element 1 may be a microbolometer. It then comprises a portion of electrically conductive material whose electrical resistance value varies as a function of its temperature. This portion of variable electrical resistance material is at least partially thermally insulated from its environment, so that the radiation R that is received and absorbed by this portion causes an increase in its temperature, and consequently a variation in its electrical resistance value. This electrical resistance value constitutes the raw detection signal which is read for each captured image. Such measurement principle is very well known, so it is not necessary to describe it again here.

It is also known that a microbolometer of this type has a first-order transfer function with respect to time, which is characterized by a value of a gain coefficient denoted G, and by a value of a characteristic response time denoted $\tau$. The transfer function, which is denoted by f(s) and is dependent on the Laplace variable s, is then $$f(s) = \frac{G}{1+\tau \cdot s}.$$

In lighting conditions with an intensity of the radiation R which varies sinusoidally over time according to a frequency v, the detection signal produced by the sensitive element also varies over time at frequency v, with an amplitude which is given by the formula $A_d = f(j2\pi \cdot v) \cdot A_R$, where $A_R$ is the complex amplitude of the intensity of the radiation R, $A_d$ is the complex amplitude of the raw detection signal, and j is the imaginary unit of the complex numbers. Commonly, the characteristic response time $\tau$ may be between 7 ms (millisecond) and 15 ms, and the value of the gain G depends in particular on the geometric and thermal features of the sensitive element. The detection signal produced by the sensitive element depends on the intensity of the radiation R which has been received at each instant until the moment when the detection signal is read. This behavior is called memory effect, and reduces the sensitivity of the sensitive element to rapid variations in the intensity of the radiation R. This reduction in sensitivity is due to an effect of weighted combination of the instantaneous values of the intensity of the radiation previously received by the sensitive element. This results in a temporal smoothing of these values in the detection signals produced by the sensitive element. The characteristic response time $\tau$ defines the time scale according to which a contribution occurs to the detection signal that is read, from radiation received at a time prior to that of the reading of the detection signal. Such contribution to the value of the detection signal that is read is affected by a multiplicative attenuation factor of the type exp(−t/$\tau$), which applies to the intensity of the radiation received before the read-out time, where t is the duration between the time at which the radiation was received by the sensitive element and the read-out time.

To form the image sensor 10, the matrix 10*a* of sensitive elements 1 is associated with a controller 10*b*, denoted CTRL. In a known manner, the controller 10*b* has the power supply and reading functions for each of the sensitive elements 1, an addressing function for each sensitive element 1 within the matrix 10*a*, and possibly additional functions such as a test function for the sensitive elements 1, an optional thermalization function for at least some of the sensitive elements, and a digitization of the detection signals. In each read-out cycle of all the sensitive elements 1 of the matrix 10*a*, the controller 10*b* outputs the values of the detection signals which have been read from all the sensitive elements 1, with one detection signal value read per sensitive element for each captured image. The read-out of these detection signals, which have been called raw detection signals in the general part of this description, constitutes an image capture operation, and the image thus directly obtained is called raw image. The read-out of the matrix of sensitive elements may be performed according to one of the following two modes: rolling shutter, or snapshot mode. In the first case, the rows of the matrix are read sequentially, row by row, and in the second case, all rows are read at the same time. This difference in the reading mode of the image sensor in no way affects the principle of the invention, nor the results. The following detailed description is provided as a non-limiting example for the snapshot reading mode. To transpose it to the case of reading images using rolling shutter mode, one can consider for example the read-out times mentioned thereafter as being those of the first row of the matrix.

Although not shown in FIG. 1, an optics may be used in front of the matrix 10a, in order to optically conjugate a scene to be imaged with the matrix 10a of the sensitive elements 1. The radiation R then passes through this conjugating lens before being incident on the sensitive elements 1.

For the invention, the image sensor 10 further comprises an image processing module 11, which is connected so as to receive at input the raw images outputted by the controller 10b. The module 11 is designed to produce processed images from the raw images, in order to compensate for or at least partially correct the memory effect of the sensitive elements 1 which has been described above. For this reason, the processed images produced according to the invention by the image sensor including this module 11 are called corrected images. The image processing module 11 may be a dedicated electronic circuit, or may be a software module hosted in a processor, denoted CPU.

According to the invention, the image processing module 11 produces a corrected image from a raw image, by subtracting from this raw image another raw image which was previously captured, multiplied by a determined coefficient. Multiplying a raw image by a coefficient is understood to mean the operation which consists of multiplying by this coefficient all the raw detection signals which constitute the raw image. Furthermore, subtraction of a first image from a second image is understood to mean the operation which consists, independently for each sensitive element 1, of calculating the difference between the detection signal which was read for the second image and the one read for the first image. Thus, according to the invention, a corrected image denoted $S_{corr}(t)$ may be obtained by calculating and grouping the values $S_{i,j_{corr}}(t)=\beta \cdot [S_{i,j\_raw}(t) - \alpha \cdot S_{i,j\_raw}(t-\Delta)]$, where t is the read-out time of a new raw image, denoted $S_{raw}(t)$ and composed of raw detection signals $S_{i,j\_raw}(t)$, t–Δ is the read-out time of a prior raw image, denoted $S_{raw}(t-\Delta)$ and composed of raw detection signals $S_{i,j\_raw}(t-\Delta)$, Δ is the duration between the read-out times of both raw images $S_{raw}(t)$ and $S_{raw}(t-\Delta)$, and $S_{i,j\_raw}(t)$ is the raw detection signal as read at time t for sensitive element i,j in the matrix 10a, i and j respectively being the row and column numbers of the sensitive element considered. α is the multiplicative coefficient which is applied to the prior raw image $S_{raw}(t-\Delta)$, and β is a global multiplicative coefficient. α and β are positive and non-zero. $S_{i,j\_corr}(t)$ is then the image point intensity value of the corrected image $S_{corr}(t)$, for the image point associated with the sensitive element located at the intersection of the $i^{th}$ row and the $j^{th}$ column of the matrix 10a.

Advantageously, the coefficient α, and possibly also the coefficient β, may be selected to vary as a function of the duration between the read-out times of both raw images $S_{raw}(t-\Delta)$ and $S_{raw}(t)$, which are separately composed of the read-out raw signals $S_{i,j\_raw}(t-\Delta)$ and $S_{i,j\_raw}(t)$.

Possibly, but optionally, at least one of the coefficients α and β may have values which are different for sensitive elements 1 which are distinct in the matrix 10a. In this case, the values of the coefficients α and β may be determined separately for each sensitive element 1, during a calibration or benchmarking step which may be carried out before each image capture sequence, or in laboratory.

In preferred implementations of the invention, coefficient α may be determined in accordance with the equation:

$$\alpha = \exp\left(-\frac{\Delta}{\tau}\right),$$

where Δ again designates the duration between the respective read-out times of the sensitive element for both raw images $S_{raw}(t-\Delta)$ and $S_{raw}(t)$, and τ again designates the characteristic response time of the sensitive element. Optionally, the value used for the characteristic response time T may vary according to the sensitive element 1 inside the matrix 10a. In this case, the values of the characteristic response time τ for all sensitive elements 1 may have been determined separately for each sensitive element during the calibration or benchmarking step, carried out before each image capture sequence or in laboratory. They are then stored within the image processing unit 11 or in a memory which is accessible to the unit 11.

In even more preferred implementations of the invention, coefficient β may be determined according to the equation:

$$\beta = \frac{a}{1 - \exp\left(-\frac{\Delta}{\tau}\right)},$$

where a is a non-zero constant which can set a scale for the image point intensity values of the corrected images. For these implementations, the image point intensity value of the corrected image $S_{corr}(t)$ for sensitive element i,j is then $$S_{i,j_{corr}}(t) = \frac{a}{1 - \exp\left(-\frac{\Delta}{\tau}\right)} \cdot \left[S_{i,j\_raw}(t) - e^{-\Delta/\tau} \cdot S_{i,j\_raw}(t-\Delta)\right].$$

The use of such value for coefficient β makes it possible to reduce attenuation effects on the intensity of the corrected image when the duration Δ between the respective read-out times of the two raw images is short.

The expressions cited above for coefficient α, and possibly also for coefficient β, make it possible to correct the memory effect in a particularly efficient manner when the sensitive element is of a type with first-order transfer function with respect to time, as described above. Indeed, in this case, the raw image $S_{raw}(t-\Delta)$, corresponding to the prior raw image as called in the general part of the present description, when it is multiplied by α=exp(–Δ/τ), quantifies the memory effect contribution which is associated with all the radiation received by each sensitive element before the capture of this prior raw image. This memory effect contribution, which can be called the long-term memory effect and which contributes to the new raw image $S_{raw}(t)$, is then completely eliminated by the invention in the corrected image $S_{corr}(t)$. However, another memory effect contribution, which is associated with the radiation received by each sensitive element during the duration Δ between the respective read-out times of both raw images, remains. This can be called the short-term memory effect.

When a sensitive element is not of a type with first-order transfer function with respect to time, the expression of coefficient α as a function of the characteristic response time τ and of the duration Δ can still be used. To this end, an empirical value adapted to the sensitive element concerned may be adopted for the characteristic response time τ, even if this value has no theoretical significance relating to the transfer function f(s) of the sensitive element.

Figure 2:
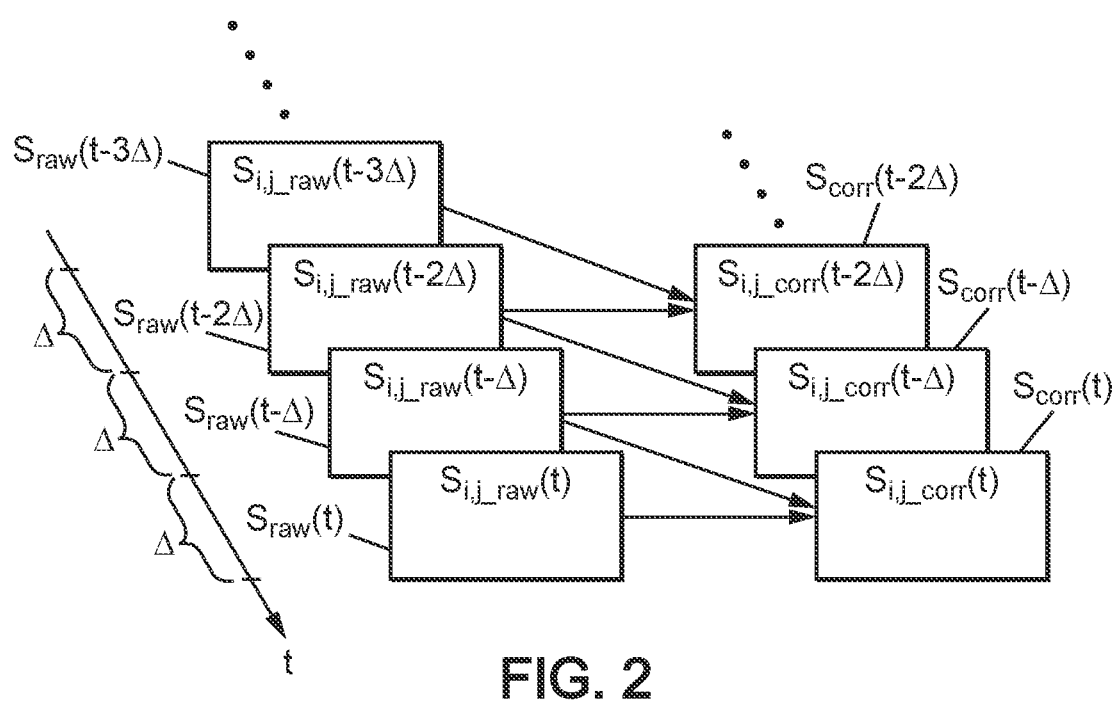
FIG. 2 to FIG. 4 illustrate different sequences for producing corrected images, in accordance with the invention.

FIG. 2 illustrates a video sequence capture, during which raw images are periodically captured at read-out times separated by a duration Δ. Thus, a last raw image $S_{raw}(t)$ is composed of the raw detection signals $S_{i,j\_raw}(t)$ read at time t, an immediately prior raw image $S_{raw}(t-Δ)$ is composed of the raw detection signals $S_{i,j\_raw}(t-Δ)$ read at time t-Δ, a raw image $S_{raw}(t-2Δ)$ preceding that one is composed of the raw detection signals $S_{i,j\_raw}(t-2Δ)$ read at time t-2Δ, yet another raw image $S_{raw}(t-3Δ)$ preceding that one consists of the raw detection signals $S_{i,j\_raw}(t-3Δ)$ read at time t-3Δ, etc. Then a corrected video sequence, composed of images corrected according to the invention, can be constructed with a same frame rate equal to 1/Δ, by combining each raw image with the last one read just before it. Thus, raw images $S_{raw}(t)$ and $S_{raw}(t-Δ)$ are combined in order to obtain according to the invention the corrected image $S_{corr}(t)$, composed of the image point intensity values $S_{i,j\_corr}(t)$; raw images $S_{raw}(t-Δ)$ and $S_{raw}(t-2Δ)$ are combined in order to obtain according to the invention the corrected image $S_{corr}(t-Δ)$, composed of the image point intensity values $S_{i,j\_corr}(t-Δ)$; raw images $S_{raw}(t-2Δ)$ and $S_{raw}(t-3Δ)$ are combined in order to obtain according to the invention corrected image $S_{corr}(t-2Δ)$, composed of the image point intensity values $S_{i,j\_corr}(t-2Δ)$, etc. The axis on the left in FIG. 2 corresponds to the time coordinate, denoted t. The image sensor of the invention may then comprise a display system which is controlled so as to display the corrected images, and possibly also the raw images according to a temporal correspondence. An improvement in the image contrast and tail attenuation which result from correction of the long-term memory effect can thus be assessed. This mode of correcting images in a video sequence is particularly suitable for obtaining a sequence of corrected images at the maximum image capture rate possible for the matrix 10a and the controller 10b.

Figure 3:
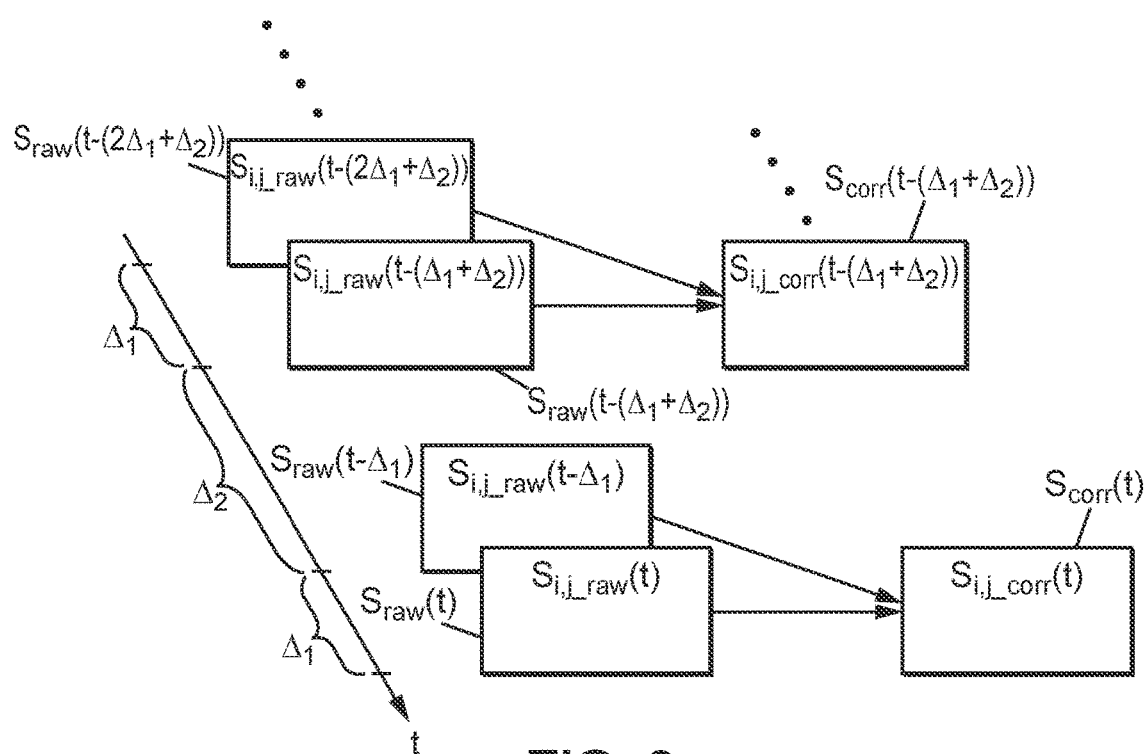

FIG. 3 corresponds to FIG. 2 when each corrected image is obtained by combining two successive raw images with the pairs of raw images dedicated to different corrected images, that are disjoint, non-interlaced, and successive. Thus, raw images $S_{raw}(t)$ and $S_{raw}(t-Δ_1)$, which are composed of raw detection signals $S_{i,j\_raw}(t)$ and $S_{i,j\_raw}(t-Δ_1)$, are combined in order to obtain according to the invention corrected image $S_{corr}(t)$. Similarly, raw images $S_{raw}(t-(Δ_1+Δ_2))$ and $S_{raw}(t-(2Δ_1+Δ_2))$, which are composed of raw detection signals $S_{i,j\_raw}(t-(Δ_1+Δ_2))$ and $S_{i,j\_raw}(t-(2Δ_1+Δ_2))$, are combined in order to obtain according to the invention corrected image $S_{corr}(t-(Δ_1+Δ_2))$, composed of image point intensity values $S_{i,j\_corr}(t-(Δ_1+Δ_2))$, etc. $Δ_i$ is the duration between the read-out times for both raw images of a same pair, for obtaining the corresponding corrected image, and $Δ_2$ is the duration between the read-out times of the prior raw image of the last pair and of the new raw image of the previous pair. The video frequency of the corrected images is then $1/(Δ_1+Δ_2)$. This other mode of correcting images in a video sequence is suitable for obtaining a video of corrected images at low frame rate, while being able to use a short duration between the two raw images combined to obtain each corrected image.

Figure 4:
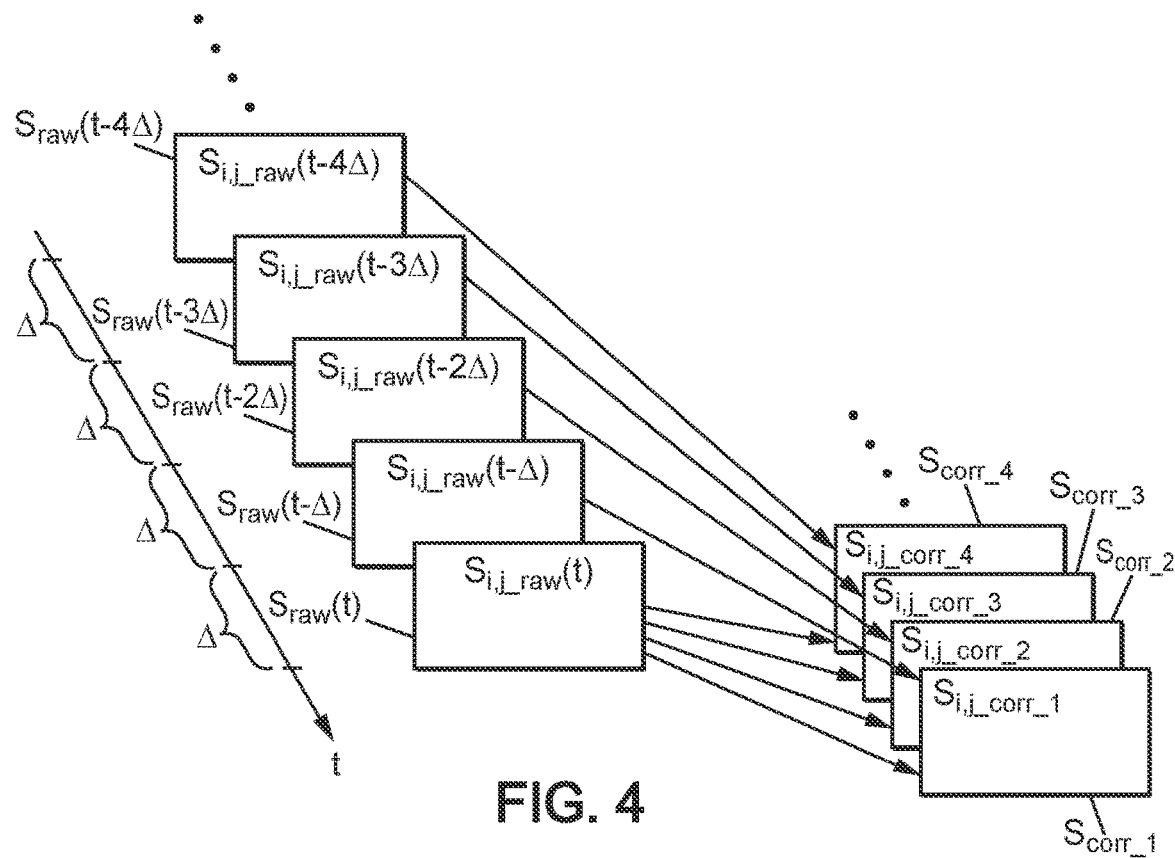

FIG. 4 also corresponds to FIG. 2, again considering a video sequence of raw images which are captured at frequency 1/Δ. But this time, a series of corrected images is produced by each time combining the same last captured raw image with a different raw image by chronologically and progressively using the prior raw images upstream in the video sequence. Thus, a first corrected image $S_{corr\_1}$ composed of image point intensity values $S_{i,j\_corr\_1}$, is obtained by combining raw images $S_{raw}(t)$ and $S_{raw}(t-Δ)$ separately constructed from raw detection signals $S_{i,j\_raw}(t)$ and $S_{i,j\_raw}(t-Δ)$, using coefficients $$\alpha = \exp\left(-\frac{\Delta}{\tau}\right) \text{ and } \beta = \frac{a}{1 - \exp\left(-\frac{\Delta}{\tau}\right)}.$$

A second corrected image $S_{corr\_2}$, composed of image point intensity values $S_{i,j\_corr\_2}$, is obtained by reusing raw image $S_{raw}(t)$ and combining it with image $S_{raw}(t-2Δ)$ composed of raw detection signals $S_{i,j\_raw}(t-2Δ)$, using coefficients $$\alpha = \exp\left(-\frac{2\cdot\Delta}{\tau}\right) \text{ and } \beta = \frac{a}{1 - \exp\left(-\frac{2\cdot\Delta}{\tau}\right)}.$$

A third corrected image $S_{corr\_3}$, composed of image point intensity values $S_{i,j\_corr\_3}$, is obtained by combining raw image $S_{raw}(t)$ with image $S_{raw}(t-3Δ)$ constructed from raw detection signals $S_{i,j\_raw}(t-3Δ)$, using coefficients $$\alpha = \exp\left(-\frac{3\cdot\Delta}{\tau}\right) \text{ and } \beta = \frac{a}{1 - \exp\left(\frac{3\cdot\Delta}{\tau}\right)}.$$

Similarly, a fourth corrected image $S_{corr\_4}$, composed of image point intensity values $S_{i,j\_corr\_4}$, is obtained by combining raw image $S_{raw}(t)$ with image $S_{raw}(t-4Δ)$ constructed from raw detection signals $S_{i,j\_raw}(t-4Δ)$, using coefficients $$\alpha = \exp\left(-\frac{4\cdot\Delta}{\tau}\right) \text{ and } \beta = \frac{a}{1 - \exp\left(-\frac{4\cdot\Delta}{\tau}\right)},$$

etc. The set of corrected images thus obtained makes it possible to assess the effects of the duration between the raw images which are combined according to the invention, on the quality of the corrected images. Some of these advantageous effects are presented here: better rendering of high spatial frequencies in the image in the presence of lateral movement, and reduction of the tail effect.

Rendering of image spatial frequencies in the presence of lateral movement. It is known that one way to highlight the attenuation of the temporal transfer function of a matrix of sensitive elements is to capture an image of a spatial pattern which is periodic and moved at constant speed parallel to its direction of periodicity. Each sensitive element thus receives radiation whose instantaneous intensity varies periodically according to a temporal frequency value which is equal to the product of the apparent travel speed and the period of the pattern. A scene which consists of bands parallel to the direction of the columns of the matrix 10a, and whose luminance varies sinusoidally parallel to the direction of the rows of the matrix 10a, is imaged onto the matrix 10a of sensitive elements 1. The spatial frequency of these bands in the scene image is denoted $v_s$, which can be expressed in pixels$^{-1}$. This scene is moving at constant speed parallel to the rows of the matrix 10a, and V designates the speed of movement of the image of the scene on the matrix 10a, which can be expressed in pixels/s (pixels per second). It is assumed that all the sensitive elements 1 have the same value for the characteristic response time τ, and that their common transfer function is $$f(s) = \frac{G}{1 + \tau \cdot s}.$$

Figure 5:
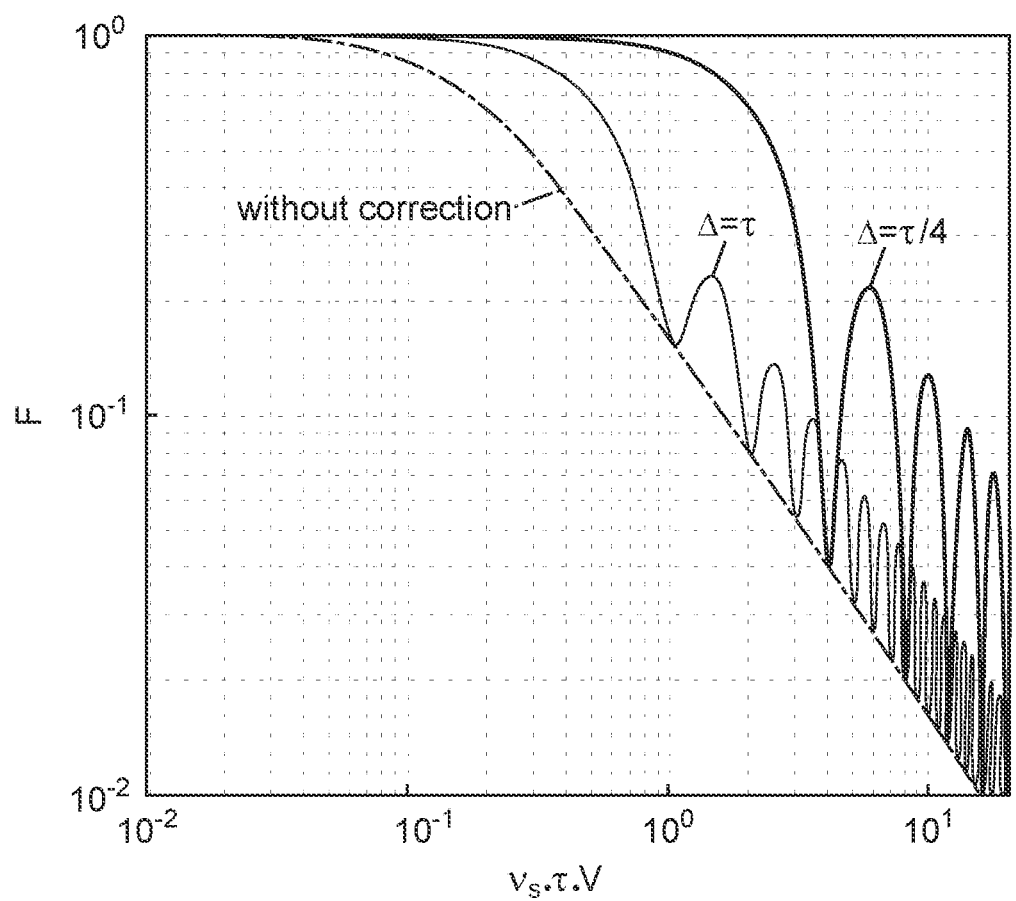
FIG. 5 illustrates a first advantage of the invention, concerning image contrast.

FIG. 5 is a diagram which illustrates the variations of the apparent transfer function of the image sensor, as a function of the spatial image frequency $v_s$ or of the movement speed V. The horizontal axis of the diagram identifies the values of the spatial frequency $v_s$, multiplied by the characteristic response time τ and by the speed V, in order to obtain a dimensionless variable. The product $V \cdot v_s$ corresponds to the temporal frequency of variation of the intensity of the radiation received by each sensitive element. The vertical axis identifies the values F of the amplitude of the apparent transfer function of the image sensor. The lower curve which appears in FIG. 5, and which is designated by the words "without correction", corresponds to the raw detection signals $S_{i,j\_raw}$ as delivered by the controller 10b, before memory effect correction, as functions of the speed V or of the spatial frequency $v_s$. It is therefore the read-out signals which compose each raw image captured during movement of the scene. The curve denoted Δ=τ corresponds to the image point intensity values of a corrected image which is obtained by combining two raw images captured during movement of the scene at read-out times separated by a duration Δ which is equal to τ. Similarly, the curve which is denoted Δ=τ/4 corresponds to the image point intensity values of a corrected image which is obtained by combining two raw images captured during movement of the scene at read-out times separated by a duration Δ which is equal to τ/4. These corrected images use values for coefficient β which are calculated for each one as indicated above in this description. The general increase in amplitude F of the transfer function of the image sensor when going from the raw image to the corrected image with Δ=τ, then to the corrected image with Δ=τ/4, corresponds to an increasing correction of the memory effect of the sensitive elements 1. In other words, the short-term memory effect which is not compensated for in the corrected images is increasingly reduced. The gain in amplitude F of the transfer function of the image sensor, compared to the raw image when the dimensionless spatial frequency is greater than 1.0, is about 2.1 for the image corrected with Δ=τ, apart from particular spatial frequencies corresponding to integer values for $v_s \cdot \tau \cdot V$. For these particular spatial frequencies, called blind frequencies, both raw images which are combined to obtain the corrected image are identical, so that the memory effect correction has no effect. For the image corrected with Δ=τ/4, the gain in amplitude F of the transfer function of the image sensor, again in comparison to the raw image but when the dimensionless spatial frequency is greater than 2.0, is about 8, and the blind frequencies correspond to values for $v_s \cdot \tau \cdot V$ which are multiples of four.

Tail Effect.

Figure 6:
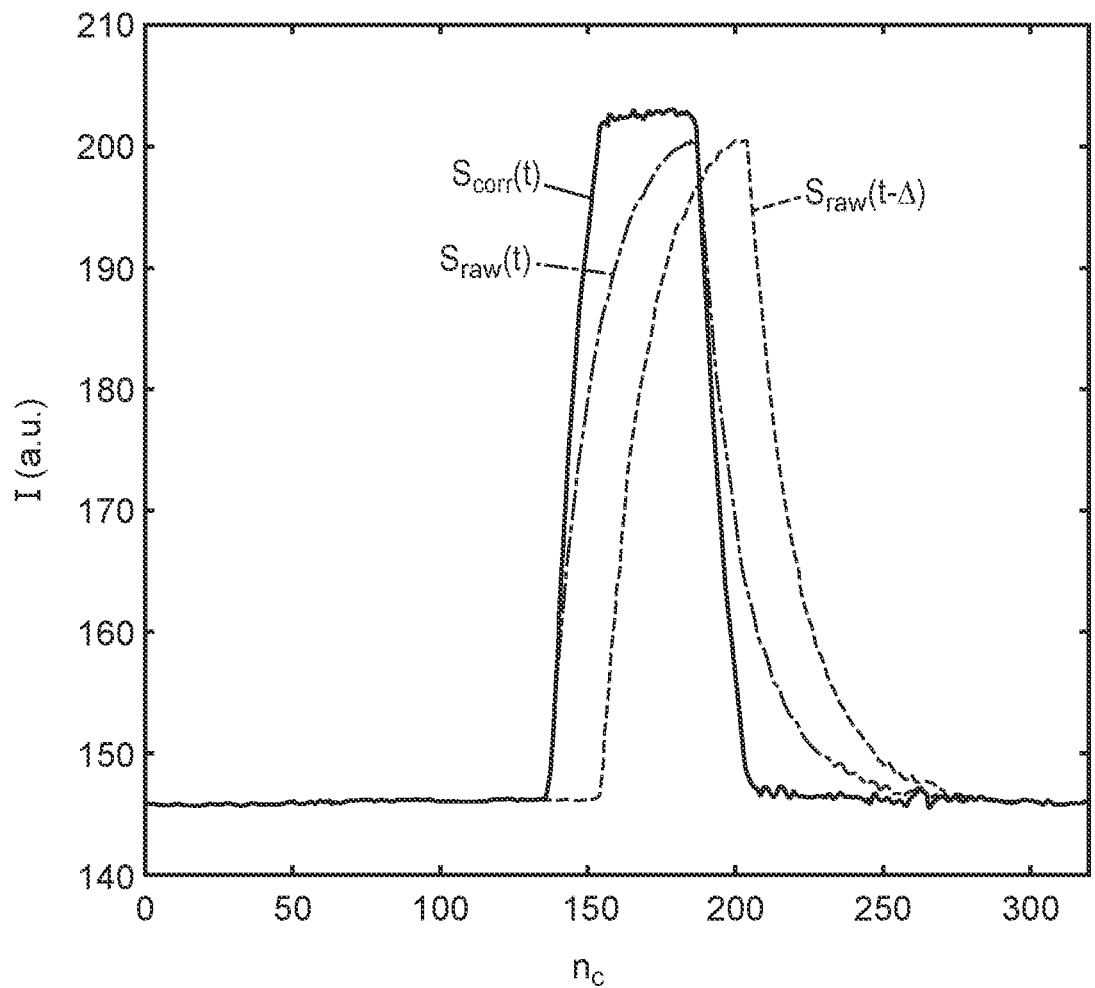
FIG. 6 illustrates a second advantage of the invention, concerning a tail effect possibly present in the images.

The matrix 10a used comprises 320 columns and 240 rows of sensitive elements 1, and the characteristic response time τ of all the sensitive elements is approximately 14 ms. An image sensor which is composed from this matrix of sensitive elements captures a video sequence having a uniform background composed of a black body at 325 K (Kelvin), through the upper part of an opaque rotating disc which has three radial slit openings. The matrix 10a is optically conjugate with the rotating disk, and the axis of rotation of the disk is parallel to the optical axis of the conjugating optics used. The rotation speed of the disk is 1.5 revolutions per second, and the raw image acquisition rate is 60 images per second, corresponding to a duration between the respective read-out times for any two successive raw images which is equal to 16.7 ms. The diagram of FIG. 6 reproduces the values of the raw detection signals which are read in a row of the matrix 10a for two raw images successively captured in the video, respectively denoted $S_{raw}(t-\Delta)$ and $S_{raw}(t)$. It also reproduces the image point intensity values for the same row of the matrix 10a, for the corrected image $S_{corr}(t)$ which is obtained according to the invention from the two raw images $S_{raw}(t-\Delta)$ and $S_{raw}(t)$. The movement of one of the radial slits of the rotating disc is visible between both raw images: from the right of the diagram to the left. The horizontal axis of the diagram of FIG. 6 identifies, by their column numbers $n_c$, the sensitive elements 1 of the row under consideration in the matrix 10a, and the vertical axis identifies the values I of the raw detection signals or the image point intensity values, for the three images $S_{raw}(t)$, $S_{raw}(t-\Delta)$ and $S_{corr}(t)$. The progressively inclined rising and falling edges of the intensity curve, which correspond to the two edges of the slit in the raw images $S_{raw}(t)$ and $S_{raw}(t-\Delta)$, constitute a tail effect due to the combination of movement of the slit and the memory effect of the sensitive elements 1. In the corrected image $S_{corr}(t)$, the two edges of the slit appear sharper, showing the efficiency of the memory effect compensation. For this example, the formulae provided above in the present description for coefficients α and β result in $S_{i,j\_corr}(t) = 1.437 \times S_{i,j\_raw}(t) - 0.437 \times S_{i,j\_raw}(t-\Delta)$. Generally, the adjustment of the ratio between the duration Δ which separates successive raw images of a video sequence and the characteristic response time τ of the sensitive elements may depend on a trade-off between reduction of the tail effect, improvement in the geometric rendering of the scene elements in the images, and amplification of image noise in the corrected images. For example, values that are between 0.02 and 0.2 for the ratio Δ/τ may be adapted when the signal-to-noise ratio of the raw image is greater than 150, respectively 15.

It is understood that the invention can be reproduced while modifying secondary aspects of the modes of implementation which have been described in detail above, while retaining at least some of the advantages cited. In particular, the selection of the raw images which are combined in pairs to obtain the corrected images, can be modified with respect to the illustrated examples. In addition, one will recall that the use of a coefficient β which depends on the duration Δ between the raw images combined to form a corrected image is optional, even if the coefficient α used is calculated according to this duration Δ.

The invention claimed is:

1. A method for capturing images, the method comprising:
successively capturing a plurality of images using a same matrix of sensitive elements, each of the sensitive elements exhibiting a memory effect which makes a raw detection signal of said sensitive element depend on an amount of radiation received by said sensitive element at a read-out time at which the raw detection signal is read and depend on amounts of radiation received by said sensitive element before said read-out time; and separately assigning an image point intensity value to each of the sensitive elements of the matrix to form a corrected image which is at least partially corrected for the memory effect, said image point intensity value being proportional to a difference between the raw detection signal of the sensitive element as read for a new raw image that is captured, and a part of the raw detection signal of the same sensitive element as read for a prior raw image, which was captured before said new raw image was captured, wherein the image point intensity value which is attributed to each of the sensitive elements in order to form the corrected image is proportional to a result of dividing by $[1-\exp(-\Delta/\tau)]$ a difference between the raw detection signal of the sensitive element as read for the new raw image, and the result of multiplying by $\exp(-\Delta/\tau)$ the raw detection signal of the same sensitive element as read for the prior raw image, where $\exp(.)$ designates an exponential function, $\tau$ is a characteristic response time of the sensitive element, and $\Delta$ is a non-zero duration between the read-out times of said sensitive element respectively for the new raw image and the prior raw image.

2. The method according to claim 1, wherein the duration $\Delta$, between the respective read-out times of a same sensitive element respectively for the new raw image and for the prior raw image, is less than the characteristic response time t of said sensitive element.

3. The method according to claim 2, wherein the prior raw image is the last one of a plurality of images that have been captured before the new raw image, according to a chronological order of capture of the raw images.

4. The method according to claim 2, wherein each of the sensitive elements is one of a bolometer or a microbolometer, a thermopile, a pyroelectric sensor, a ferroelectric sensor, and a thermally deformable microlever sensor.

5. The method according to claim 2, wherein each of the corrected images is formed from a pair of raw images comprising the new raw image and the prior raw image captured before said new raw image, and wherein the pairs of raw images used to form successive corrected images are disjoint, non-interlaced, and chronologically successive.

6. The method according to claim 2, wherein a plurality of corrected images are formed by combining a same new raw image with a plurality of prior raw images successively captured before the same new raw image, and wherein each of the corrected images is obtained by using, for the duration $\Delta$ relating to each sensitive element, the difference between the read-out times of said sensitive element respectively for said new raw image and for the prior raw image which are combined to form said respective corrected image.

7. An image sensor comprising:

a matrix of sensitive elements, each of the sensitive elements exhibiting a memory effect which makes a raw detection signal that is read from said sensitive element depend on an amount of radiation received by said sensitive element at a read-out time at which the raw detection signal is read and depend on amounts of radiation received by said sensitive element before said read-out time, and an image processor configured to output corrected images at least partially corrected for the memory effect, each of the corrected images being formed by image point intensity values which are respectively assigned to the sensitive elements of the matrix, the image processor being configured to calculate the image point intensity value of any one of the sensitive elements as being proportional to a difference between the raw detection signal of said sensitive element as read for a new raw image that is captured, and a part of the raw detection signal of the same sensitive element as read for a prior raw image, which was captured before said new raw image was captured, wherein the image point intensity value which is assigned to each of the sensitive elements in order to form the corrected image is proportional to a result of dividing by $[1-\exp(-\Delta/\tau)]$ a difference between the raw detection signal of the sensitive element as read for the new raw image, and a result of multiplying by $\exp(-\Delta/\tau)$ the raw detection signal of the same sensitive element as read for the prior raw image, where $\exp(.)$ denotes an exponential function, $\tau$ is a characteristic response time of the sensitive element, and $\Delta$ is a non-zero duration between the read-out times of said sensitive element respectively for the new raw image and the prior raw image, wherein the image sensor is configured to implement the method of claim 2.

8. The method according to claim 1, wherein the prior raw image is the last one of a plurality of images that have been captured before the new raw image, according to a chronological order of capture of the raw images.

9. The method according to claim 8, wherein each of the sensitive elements is one of a bolometer or a microbolometer, a thermopile, a pyroelectric sensor, a ferroelectric sensor, and a thermally deformable microlever sensor.

10. The method according to claim 8, wherein each of the corrected images is formed from a pair of raw images comprising the new raw image and the prior raw image captured before said new raw image, and wherein the pairs of raw images used to form successive corrected images are disjoint, non-interlaced, and chronologically successive.

11. The method according to claim 8, wherein a plurality of corrected images are formed by combining a same new raw image with a plurality of prior raw images successively captured before the same new raw image, and wherein each of the corrected images is obtained by using, for the duration $\Delta$ relating to each sensitive element, the difference between the read-out times of said sensitive element respectively for said new raw image and for the prior raw image which are combined to form said respective corrected image.

12. An image sensor comprising:

a matrix of sensitive elements, each of the sensitive elements exhibiting a memory effect which makes a raw detection signal that is read from said sensitive element depend on an amount of radiation received by said sensitive element at a read-out time at which the raw detection signal is read and depend on amounts of radiation received by said sensitive element before said read-out time, and an image processor configured to output corrected images at least partially corrected for the memory effect, each of the corrected images being formed by image point intensity values which are respectively assigned to the sensitive elements of the matrix, the image processor being configured to calculate the image point intensity value of any one of the sensitive elements as being proportional to a difference between the raw detection signal of said sensitive element as read for a new raw image that is captured, and a part of the raw detection signal of the same sensitive element as read for a prior raw image, which was captured before said new raw image was captured, wherein the image point intensity value which is assigned to each of the sensitive elements in order to form the corrected image is proportional to a result of dividing by $[1-\exp(-\Delta/\tau)]$ a difference between the raw detection signal of the sensitive element as read for the new raw image, and a result of multiplying by $\exp(-\Delta/\tau)$ the raw detection signal of the same sensitive element as read for the prior raw image, where exp(.) denotes an exponential function, $\tau$ is a characteristic response time of the sensitive element, and $\Delta$ is a non-zero duration between the read-out times of said sensitive element respectively for the new raw image and the prior raw image, wherein the image sensor is configured to implement the method of claim 8.

13. The method according to claim 1, wherein each of the sensitive elements is one of a bolometer or a microbolometer, a thermopile, a pyroelectric sensor, a ferroelectric sensor, and a thermally deformable microlever sensor.

14. The method according to claim 13, wherein each of the corrected images is formed from a pair of raw images comprising the new raw image and the prior raw image captured before said new raw image, and
  wherein the pairs of raw images used to form successive corrected images are disjoint, non-interlaced, and chronologically successive.

15. The method according to claim 13, wherein a plurality of corrected images are formed by combining a same new raw image with a plurality of prior raw images successively captured before the same new raw image, and
  wherein each of the corrected images is obtained by using, for the duration $\Delta$ relating to each sensitive element, the difference between the read-out times of said sensitive element respectively for said new raw image and for the prior raw image which are combined to form said respective corrected image.

16. An image sensor comprising:
  a matrix of sensitive elements, each of the sensitive elements exhibiting a memory effect which makes a raw detection signal that is read from said sensitive element depend on an amount of radiation received by said sensitive element at a read-out time at which the raw detection signal is read, but also and depend on amounts of radiation received by said sensitive element before said read-out time, and
  an image processor configured to output corrected images at least partially corrected for the memory effect, each of the corrected images being formed by image point intensity values which are respectively assigned to the sensitive elements of the matrix, the image processor being configured to calculate the image point intensity value of any one of the sensitive elements as being proportional to a difference between the raw detection signal of said sensitive element as read for a new raw image that is captured, and a part of the raw detection signal of the same sensitive element as read for a prior raw image, which was captured before said new raw image was captured,
  wherein the image point intensity value which is assigned to each of the sensitive elements in order to form the corrected image is proportional to a result of dividing by $[1-\exp(-\Delta/\tau)]$ a difference between the raw detection signal of the sensitive element as read for the new raw image, and a result of multiplying by $\exp(-\Delta/\tau)$ the raw detection signal of the same sensitive element as read for the prior raw image, where exp(.) denotes an exponential function, $\tau$ is a characteristic response time of the sensitive element, and $\Delta$ is a non-zero duration between the read-out times of said sensitive element respectively for the new raw image and the prior raw image,
  wherein the image sensor is configured to implement the method of claim 13.

17. The method according to claim 1, wherein each of the corrected images is formed from a pair of raw images comprising the new raw image and the prior raw image captured before said new raw image, and
  wherein the pairs of raw images used to form successive corrected images are disjoint, non-interlaced, and chronologically successive.

18. The method according to claim 1, wherein a plurality of corrected images are formed by combining a same new raw image with a plurality of prior raw images successively captured before the same new raw image, and
  wherein each of the corrected images is obtained by using, for the duration $\Delta$ relating to each sensitive element, the difference between the read-out times of said sensitive element respectively for said new raw image and for the prior raw image which are combined to form said respective corrected image.

19. An image sensor comprising:
  a matrix of sensitive elements, each of the sensitive elements exhibiting a memory effect which makes a raw detection signal that is read from said sensitive element depend on an amount of radiation received by said sensitive element at a read-out time at which the raw detection signal is read and depend on amounts of radiation received by said sensitive element before said read-out time, and
  an image processor configured to output corrected images at least partially corrected for the memory effect, each of the corrected images being formed by image point intensity values which are respectively assigned to the sensitive elements of the matrix, the image processor being configured to calculate the image point intensity value of any one of the sensitive elements as being proportional to a difference between the raw detection signal of said sensitive element as read for a new raw image that is captured, and a part of the raw detection signal of the same sensitive element as read for a prior raw image, which was captured before said new raw image was captured,
  wherein the image point intensity value which is assigned to each of the sensitive elements in order to form the corrected image is proportional to a result of dividing by $[1-\exp(-\Delta/\tau)]$ a difference between the raw detection signal of the sensitive element as read for the new raw image, and a result of multiplying by $\exp(-\Delta/\tau)$ the raw detection signal of the same sensitive element as read for the prior raw image, where exp(.) denotes an exponential function, $\tau$ is a characteristic response time of the sensitive element, and $\Delta$ is a non-zero duration between the read-out times of said sensitive element respectively for the new raw image and the prior raw image, wherein the image sensor is configured to implement the method of claim 1.

20. An image sensor, comprising:
a matrix of sensitive elements, each of the sensitive elements exhibiting a memory effect which makes a raw detection signal that is read from said sensitive element depend on an amount of radiation received by said sensitive element at a read-out time at which the raw detection signal is read and depend on amounts of radiation received by said sensitive element before said read-out time, and an image processor configured to output corrected images at least partially corrected for the memory effect, each of the corrected images being formed by image point intensity values which are respectively assigned to the sensitive elements of the matrix, the image processor being configured to calculate the image point intensity value of any one of the sensitive elements as being proportional to a difference between the raw detection signal of said sensitive element as read for a new raw image that is captured, and a part of the raw detection signal of the same sensitive element as read for a prior raw image, which was captured before said new raw image was captured, wherein the image point intensity value which is assigned to each of the sensitive elements in order to form the corrected image is proportional to a result of dividing by $[1-\exp(-\Delta/\tau)]$ a difference between the raw detection signal of the sensitive element as read for the new raw image, and a result of multiplying by $\exp(-\Delta/\tau)$ the raw detection signal of the same sensitive element as read for the prior raw image, where exp(.) denotes an exponential function, $\tau$ is a characteristic response time of the sensitive element, and $\Delta$ is a non-zero duration between the read-out times of said sensitive element respectively for the new raw image and the prior raw image.

* * * * *